No. 793,968. PATENTED JULY 4, 1905.
O. G. VOLD.
LEVELING ATTACHMENT FOR SEPARATORS.
APPLICATION FILED NOV. 23, 1904.
2 SHEETS—SHEET 1.
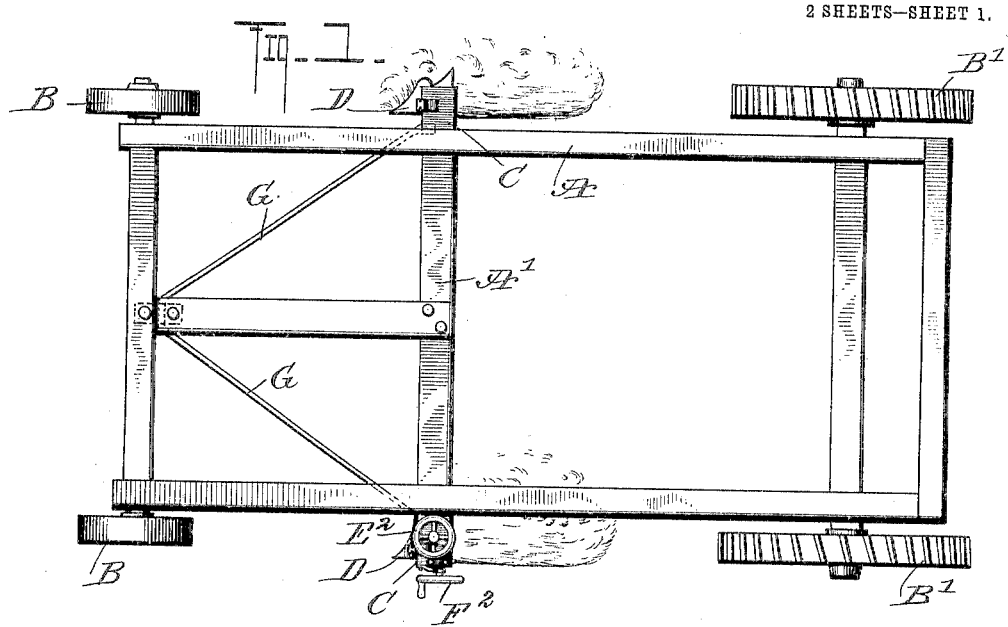
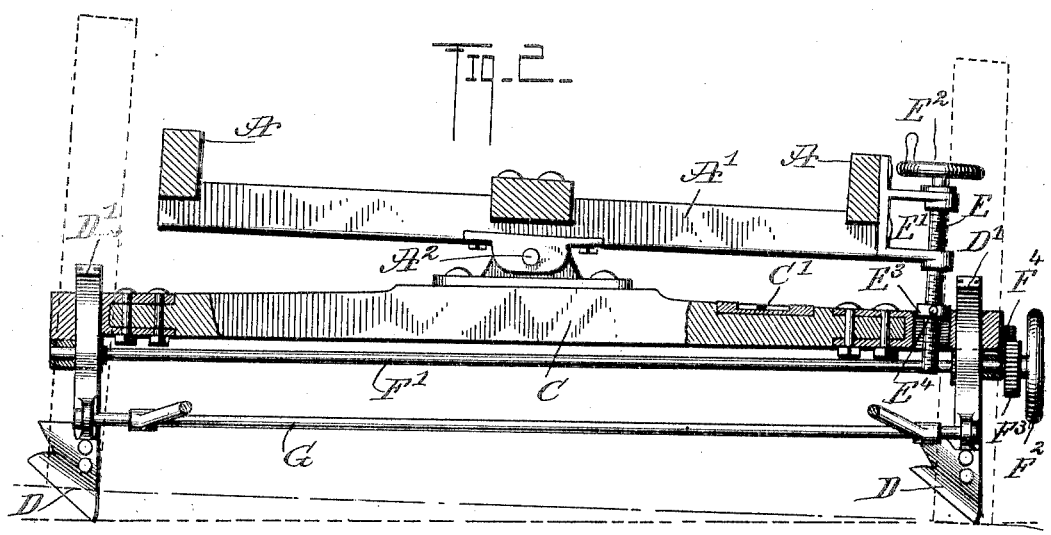
WITNESSES:
INVENTOR
Ole G. Vold
BY
ATTORNEYS No. 793,968. PATENTED JULY 4, 1905.
O. G. VOLD.
LEVELING ATTACHMENT FOR SEPARATORS.
APPLICATION FILED NOV. 23, 1904.
2 SHEETS—SHEET 2.
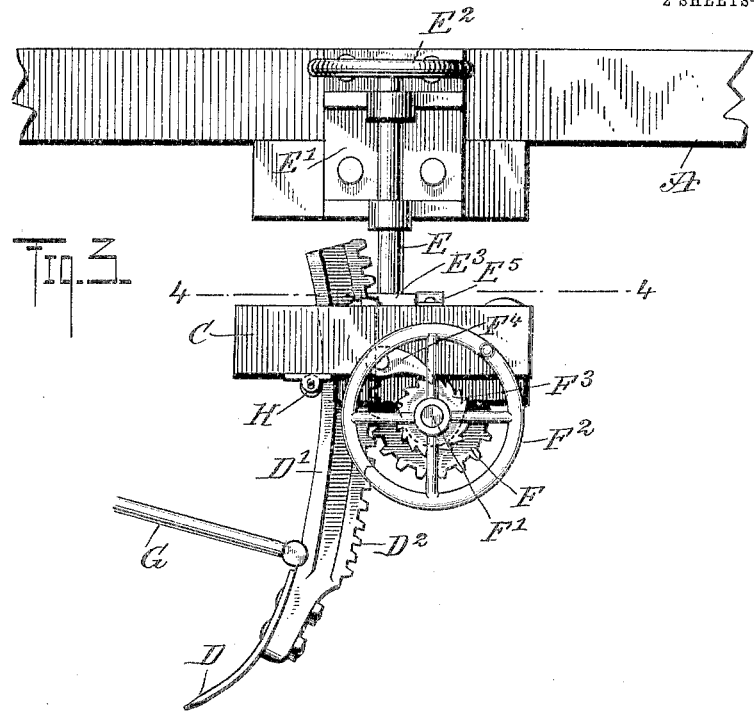
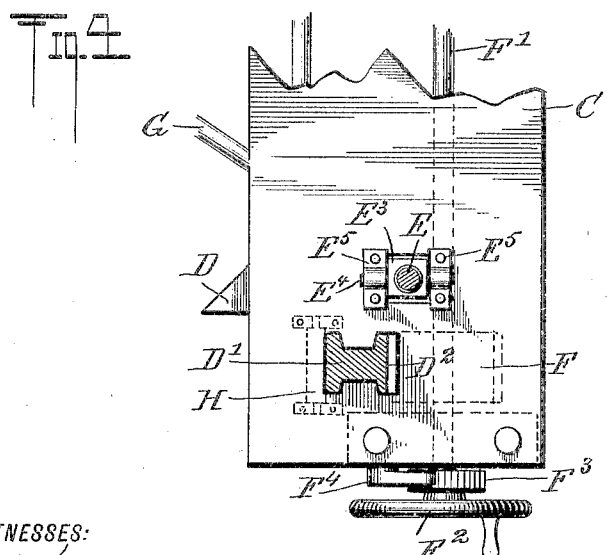
WITNESSES:
Geo. O. Kingsbury
Theo. J. Hostetz
INVENTOR
Ole G. Vold
BY
ATTORNEYS No. 793,968. Patented July 4, 1905.

UNITED STATES PATENT OFFICE.

OLE G. VOLD, OF DAWSON, MINNESOTA.

LEVELING ATTACHMENT FOR SEPARATORS.

SPECIFICATION forming part of Letters Patent No. 793,968, dated July 4, 1905.

Application filed November 23, 1904. Serial No. 233,987.

*To all whom it may concern:*

Be it known that I, OLE G. VOLD, a citizen of the United States, and a resident of Dawson, in the county of Lac qui Parle and State of Minnesota, have invented a new and Improved Leveling Attachment for Separators, of which the following is a full, clear, and exact description.

The object of the invention is to provide a new and improved leveling attachment for portable grain-separators and similar machines mounted on wheels and arranged to permit convenient application to the machine without altering the construction thereof and to form level furrows for the wheels of the machine to stand in.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement as applied to the framework of the wheeled machine. Fig. 2 is an enlarged transverse section of the same. Fig. 3 is an enlarged side elevation of the same, and Fig. 4 is a sectional plan view of the same on the line 4 4 of Fig. 3.

The frame A of the separator or other machine on which the improvement is to be applied is mounted on the usual front wheels B B and the rear or traction wheels B' B', and on the under side of the cross-beam A' of the said frame is fulcrumed at $A^2$ a transverse leveling-beam C, adapted to swing up and down and carrying at its outer ends plows D D, arranged in longitudinal alinement with the rear wheels B' B' of the machine, so that the said wheels can pass into furrows made by the plows on propelling the machine forward.

In order to make level furrows—that is, furrows lying in the same horizontal plane—it is necessary to adjust the leveling-beam C to bring the latter into a level position, and hence the plows into a horizontal plane. For this purpose an upright screw-rod E is provided, journaled in bearings E', secured to one side of the frame A, and on the upper end of the said screw-rod is secured a hand-wheel $E^2$, and the lower threaded end of the screw-rod screws in a nut $E^3$, having longitudinally-extending trunnions $E^4$, journaled in bearings $E^5$, attached to the top of the beam C. (See Figs. 3 and 4.) On the operator turning the hand-wheel $E^2$ the nut $E^3$ is caused to travel up or down on the screw-rod, according to the direction in which the hand-wheel is turned, and as the nut is held on one end of the leveling-beam C the latter is swung correspondingly up or down at this end until the beam assumes a level position, indicated by a level C', attached to the beam. (See Fig. 2.)

In order to adjust the plows D D to hold the same out of contact when the attachment is not in use or to bring the plows in proper relation to the ground for making the furrows, it is necessary to move the plows simultaneously up or down, and for this purpose the segmental shanks D' are formed with gear-teeth $D^2$ in mesh with pinions F, secured on a transverse shaft F', journaled on the under side of the leveling-beam C. On one end of the shaft F' is secured a hand-wheel $F^2$, adapted to be turned by the operator to turn the shaft F' and cause the pinions F to impart simultaneous up or down traveling motion to the shanks D' and their plows D. In order to lock the shaft F' in place after the desired adjustment is made, a ratchet-wheel $F^3$ is secured on the shaft F' and engaged by a pawl $F^4$, fulcrumed on the end of the beam C. In order to relieve the bearings for the shanks D' of the plows D of strain incident to the plowing of the furrows, the said shanks are pivotally connected with a brace G, extending forwardly and upwardly and fulcrumed on the under side of the frame A. The forward edges of the plow-shanks D' are in contact with friction-rollers H, journaled on the under side of the beam C to cause an easy running of the shanks in their bearings.

The operation is as follows: Immediately before the separator or like machine reaches its destination the operator turns the hand-wheel $E^2$ to swing the leveling-beam C into a horizontal position, and then the operator turns the hand-wheel F² to move the plows D D in engagement with the ground. When the separator or other machine is caused to travel forward by its own tractive power or by being drawn by a team or engine, then the plows D D make furrows which extend both in the same horizontal plane and in longitudinal alinement with the traction-wheels B' B', the latter finally passing into the said furrows, and consequently the wheels B' B' stand on level ground, so that the separator or other machine is properly leveled and ready for work. After the separator or machine is leveled then the operator turns the hand-wheel F² in a reverse direction, so as to cause the plows D D to move upward above the ground into an inactive position to permit of conveniently hauling the machine away to its next destination without the plows coming in contact with the ground or the road.

It is understood that the attachment described is preferably located on the frame A between the front and rear wheels, as illustrated in the drawings, and the attachment can be readily applied to separators and other machines without altering in the least the construction thereof.

The attachment is very simple and durable in construction, can be easily manufactured, and is not liable to easily get out of order.

Having thus described my invention, I claim as new and desire to secure by Letters Patent—

1. A leveling attachment for portable grain-separators and the like, comprising leveling-plows held in transverse alinement on the frame of the machine, and in longitudinal alinement with the wheels to be set level.

2. The combination with the frame of a portable grain-separator or the like, of plows held on the frame in longitudinal alinement with the wheels, to form furrows for the wheels to stand in, and means for adjusting the plows to bring them into the same level position.

3. The combination with the frame of a portable grain-separator or the like, of plows held on the frame in longitudinal alinement with the wheels to form furrows for the wheels to stand in, and means for simultaneously adjusting the plows to bring them into the same level position.

4. A leveling attachment for wheeled vehicles, comprising a transversely-extending leveling-beam pivoted on the vehicle-frame to swing up and down, and plows held on the said beam and in longitudinal alinement with the vehicle-wheels.

5. A leveling attachment for wheeled vehicles, comprising a transversely-extending leveling-beam pivoted on the vehicle-frame to swing up and down, plows held on the said beam and in longitudinal alinement with the vehicle-wheels, and means for adjusting the plows uniformly up and down.

6. A leveling attachment for wheeled vehicles, comprising a transverse leveling-beam fulcrumed on the vehicle-frame to swing up and down, plows having their shanks slidable up and down on the said beam, the plows standing in longitudinal alinement with the vehicle-wheels, manually-controlled means for adjusting the said leveling-beam, and manually-controlled means for moving the plows simultaneously up and down.

7. A leveling attachment for wheeled vehicles, comprising a transverse leveling-beam fulcrumed on the vehicle-frame to swing up and down, plows having their shanks slidable up and down on the said beam, the plows standing in longitudinal alinement with the vehicle-wheels, manually-controlled means for adjusting the said leveling-beam, manually-controlled means for moving the plows simultaneously up and down, and a brace fulcrumed on the vehicle-frame and pivotally connected with the plows.

In testimony whereof I have signed my name to this specification in the presence of two subscribing witnesses.

OLE G. VOLD.

Witnesses:
CHARLES O. HOLTAN,
SEVER SWENSON.